(12) United States Patent
Okada (10) Patent No.: US 10,074,045 B2
(45) Date of Patent: Sep. 11, 2018

(54) IMAGE FORMING APPARATUS HAVING CONTROL BASED ON TONER DENSITY

(71) Applicant: CANON KABUSHIKI KAISHA, Tokyo (JP)

(72) Inventor: Noriyuki Okada, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/459,614

(22) Filed: Aug. 14, 2014

(65) Prior Publication Data

US 2015/0049364 A1 Feb. 19, 2015

(30) Foreign Application Priority Data

Aug. 19, 2013 (JP) ................................. 2013-169603

(51) Int. Cl.
*G06K 15/00* (2006.01)
*G03G 15/08* (2006.01)
*G03G 15/00* (2006.01)

(52) U.S. Cl.
CPC ..... *G06K 15/4075* (2013.01); *G03G 15/0849* (2013.01); *G03G 15/0877* (2013.01); *G03G 15/556* (2013.01)

(58) Field of Classification Search
CPC ............. G03G 15/556; G03G 15/0849; G03G 15/0893; G03G 15/553; G03G 15/5041;

(Continued)

(56) References Cited

U.S. PATENT DOCUMENTS 6,526,252 B1 2/2003 Itoh et al.
6,999,689 B2 * 2/2006 Kinoshita .......... G03G 15/0893
399/27

(Continued)

FOREIGN PATENT DOCUMENTS

JP 2004-045739 A 2/2004
JP 2004-045746 A 2/2004

(Continued)

OTHER PUBLICATIONS

Noriyuki Okada, U.S. Appl. No. 14/459,807, filed Aug. 14, 2014.

(Continued)

*Primary Examiner* — Marcellus Augustin
(74) *Attorney, Agent, or Firm* — Fitzpatrick, Cella, Harper & Scinto (57) ABSTRACT

An image forming apparatus includes an image bearing member; a developing device; a supply device that supplies the developing device with toner; a density detector that detects information about a toner density serving as a ratio of toner and carrier of the developer of the developing device; and a controller that is able to execute a remaining amount determination mode which interrupts the image forming operation and performs a toner supply operation on the developing device from the supply device, based on the detection result of the density detector. The controller at least selectively executes a first state that immediately prohibits the image formation, a second state that allows the image forming operation, and a third state that executes the mode again, based on the detection result of the density detector acquired after the start of execution of the mode.

6 Claims, 11 Drawing Sheets

(58) Field of Classification Search
CPC ........... G03G 15/5058; G03G 15/0856; G03G 15/0822; G03G 15/0855; G03G 15/0863; G03G 15/0831; G03G 15/0824; G03G 15/0848; G03G 15/0877; G03G 15/5054; G03G 15/5012; G03G 15/0832; G03G 15/5033; G03G 2215/00037; G03G 2215/00054; G03G 2215/00029; G03G 2215/0888; G03G 2215/00059; G03G 15/0853; G03G 15/0887; G03G 15/0891; G03G 15/0839; G03G 15/0846
USPC .... 399/49, 50, 66, 62, 58, 53, 259, 61, 222, 399/223, 228, 24–30, 106, 258; 358/1.15, 358/1.13, 1.14, 3.24, 3.05, 3.22, 3.23, 1.9, 358/305, 504, 1.1–3.29, 1.11–1.18; 347/112, 140

See application file for complete search history.

(56) References Cited

U.S. PATENT DOCUMENTS

| | | | |
|---|---|---|---|
| 7,010,237 B2* | 3/2006 | Suzuki | G03G 15/0822 399/227 |
| 7,218,870 B2* | 5/2007 | Hirobe | G03G 15/5041 399/27 |
| 7,415,214 B2* | 8/2008 | Sakita | G03G 15/553 399/27 |
| 7,512,348 B2* | 3/2009 | Suzuki | G03G 15/0822 399/27 |
| 7,551,862 B2 | 6/2009 | Tanaka et al. | |
| 8,571,426 B2* | 10/2013 | Kubota | G03G 15/0856 399/27 |
| 8,639,135 B2* | 1/2014 | Okada | G03G 15/0849 399/39 |
| 8,826,083 B2* | 9/2014 | Yamasaki | G06F 11/0733 358/1.14 |
| 8,867,934 B2* | 10/2014 | Itoyama | G03G 15/086 399/30 |
| 9,057,985 B2 | 6/2015 | Tanaka | |
| 9,280,116 B2* | 3/2016 | Okada | G03G 15/556 |
| 9,285,704 B2* | 3/2016 | Okada | G03G 15/0831 |
| 2004/0091275 A1* | 5/2004 | Matsuda | G03G 15/0849 399/27 |
| 2005/0063714 A1 | 3/2005 | Kinoshita et al. | |
| 2005/0185973 A1* | 8/2005 | Hama | G03G 15/5058 399/27 |
| 2010/0303483 A1 | 12/2010 | Takahashi | |
| 2012/0251134 A1* | 10/2012 | Mitsui | G03G 15/0856 399/27 |
| 2013/0183049 A1 | 7/2013 | Tanaka | |

FOREIGN PATENT DOCUMENTS

| | | |
|---|---|---|
| JP | 2005-062848 A | 3/2005 |
| JP | 2006-171361 A | 6/2006 |
| JP | 2007-333876 A | 12/2007 |
| JP | 2008-309814 A | 12/2008 |
| JP | 2010-156882 A | 7/2010 |
| JP | 2010-211006 A | 9/2010 |
| JP | 2012-230248 A | 11/2012 |
| JP | 2013-145264 A | 7/2013 |

OTHER PUBLICATIONS

Noriyuki Okada, U.S. Appl. No. 14/517,323, filed Oct. 17, 2014.
Office Action dated May 23, 2017 in Japanese Patent Application No. 2013-169603.
Search Report in European Patent Application No. 14180941.8, dated Jan. 14, 2015.

* cited by examiner

| ΔTD RATIO (END) | NUMBER OF ROTATION OF SUPPLY MOTOR 73: M |
| --- | --- |
| -0.9% < ΔTD RATIO (END) < -0.6% | 10 |
| -0.6% ≤ ΔTD RATIO (END) < -0.4% | 8 |
| -0.4% ≤ ΔTD RATIO (END) < -0.2% | 6 |

IMAGE FORMING APPARATUS HAVING CONTROL BASED ON TONER DENSITY

BACKGROUND OF THE INVENTION

Field of the Invention

The present invention relates to an image forming apparatus such as a copying machine and a printer that uses an electrophotographic system or an electrostatic recording system.

Description of the Related Art

Among image forming apparatuses, digital laser beam printers of a so-called electrophotographic system have been known. In a development device equipped in the image forming apparatus, a one-component developer containing magnetic toner as a main component, or a two-component developer containing non-magnetic toner and magnetic carrier as main components has been used. In particular, in the image forming apparatus that forms a full-color or multi-color image, the two-component developer has been mainly used from the viewpoint of color of an image or the like.

There is a toner supply control as particular importance in the two-component developer. The two-component developer has the toner and the carrier, and when forming the image, a TD ratio as a ratio of the toner to the carrier changes by consumption of the toner. Since charging characteristics of the toner change depending on the value of the TD ratio, it is required to supply the toner so as to maintain the charging characteristics of the toner. A toner bottle configured to supply the toner is provided separately from the development device, and when there is no toner in the toner bottle, the toner bottle is replaced with a new one.

As a unit of determining that there is no toner (toner absence) in the toner bottle, there is a method as in US Patent Application Publication No. 2005/063714 A1. Specifically, a toner density sensor configured to detect the TD ratio of the two-component developer is equipped in the development device, and toner absence is determined according to the value thereof. Furthermore, there is a method (toner remaining amount checking sequence) of checking whether the TD ratio of the two-component developer rises from the value of the toner density sensor after the supply of toner, and determining the toner absence from the result so as to increase the accuracy of toner absence.

However, in the case of a configuration in which the toner remaining amount checking sequence is performed, the following problems may occur.

When the remaining amount of toner in the toner bottle decreases (just before toner absence), toner capable of being supplied to the development device decreases. For this reason, even in the image with less toner consumption, the TD ratio of the two-component developer decreases, and the toner remaining amount checking sequence starts.

However, even if the toner remaining amount checking sequence is performed, since the amount of toner supplied into the development device is small, the TD ratio of the two-component developer does not increase. For this reason, in some cases, the toner remaining amount checking sequence may be unnecessarily repeated. In this case, there has been a problem in that downtime due to the toner remaining amount checking sequence frequently occurs until "toner absence" is displayed. That is, in regard to the toner remaining amount checking sequence, there has been a problem of compatibility between the control time and the detection accuracy of "toner presence" and "toner absence".

Here, when simply limiting the toner remaining amount checking sequence so as to simply shorten the downtime, there is a risk of a drop of the detection accuracy of the toner density.

SUMMARY OF THE INVENTION

It is desirable to suppress a decrease in accuracy of the toner remaining amount determination, while shortening the downtime due to the toner remaining amount checking sequence as much as possible.

As a representative configuration of the present invention for achieving the above-described purpose, an image forming apparatus has: an image bearing member; a developing device which is provided with a developer bearing member that carries a developer and develops an electrostatic image formed on the image bearing member; a supply device that supplies the developing device with toner; a density detector that detects information about a toner density serving as a ratio of toner and carrier of the developer of the developing device; and a controller that is able to execute a remaining amount determination mode which interrupts the image forming operation and performs a toner supply operation on the developing device from the supply device, based on the detection result of the density detector, wherein the controller at least selectively executes a first state that immediately prohibits the image formation, a second state that allows the image forming operation, and a third state that executes the mode again, based on the detection result of the density detector acquired after the start of execution of the mode.

Further features of the present invention will become apparent from the following description of exemplary embodiments with reference to the attached drawings.

DESCRIPTION OF THE EMBODIMENTS

First Embodiment

Figure 2:
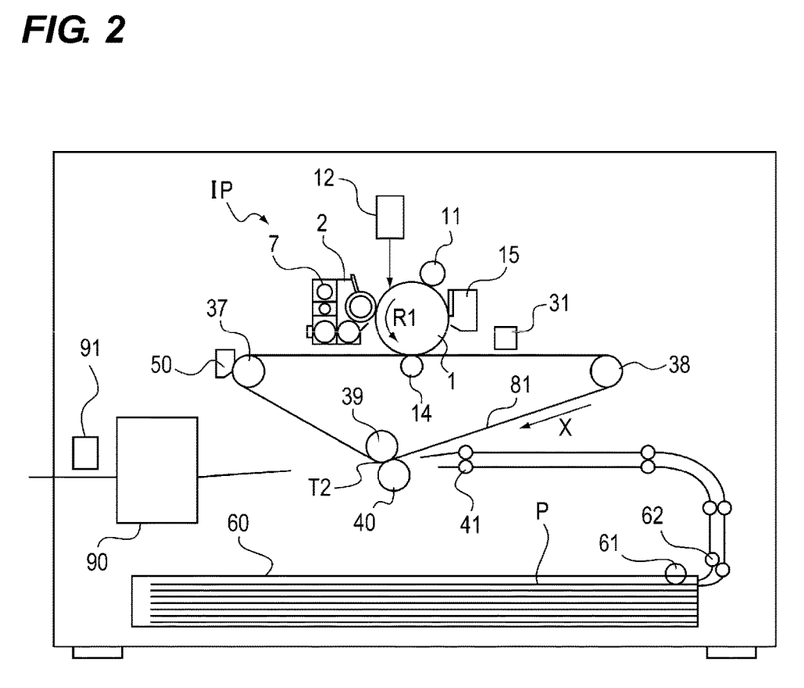
FIG. 2 is a schematic cross-sectional view illustrating an overall configuration of the image forming apparatus.

A first embodiment of the present invention will be described with reference to the drawings. FIG. 2 is a schematic cross-sectional view illustrating an overall configuration of an image forming apparatus. The image forming apparatus of this embodiment is an electrophotographic image forming apparatus of a digital type. Hereinafter, the image forming apparatus will be described in detail.

As illustrated in FIG. 2, an endless intermediate transfer belt (ITB) 81 that travels in a direction of an arrow X is disposed in the image forming apparatus. The intermediate transfer belt 81 is stretched by three rollers of a drive roller 37, a tension roller 38, and a secondary transfer inner roller 39.

A transfer material P taken out from a sheet cassette 60 is supplied to a conveying roller 61 via a pickup roller, and is conveyed to a left side in the drawings.

Figure 1:
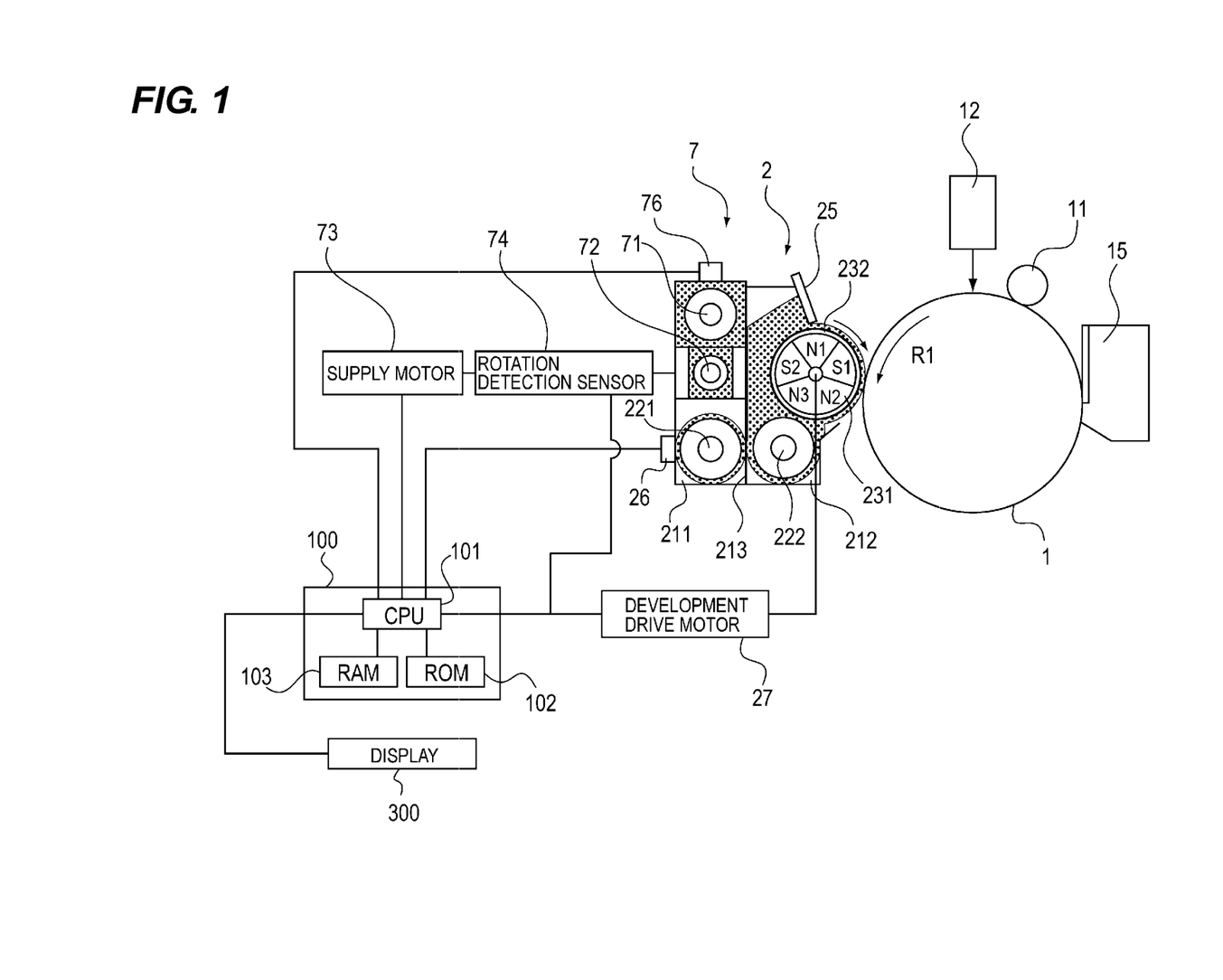
FIG. 1 is a cross-sectional view illustrating a detailed configuration of an image forming portion.

An image forming portion IP is disposed above the intermediate transfer belt 81. FIG. 1 is a cross-sectional view illustrating a detailed configuration of the image forming portion. The image forming portion is provided with a drum-shaped photosensitive drum 1 (image bearing member) that is disposed in a rotatable manner.

The photosensitive drum 1 has a support shaft (not illustrated) at a center thereof, and is rotationally driven by a drive section (not illustrated) around the support shaft in the direction of arrow R1. The rotational speed of the photosensitive drum 1 in this embodiment is 110 mm/s. Around the photosensitive drum 1, process devices such as a charging roller 11, a development device (developing machine), a primary transfer roller 14, and a cleaning device 15 are disposed.

The charging roller 11 (a primary charger) comes into contact with a surface of the photosensitive drum 1 to uniformly charge the surface to predetermined polarity and potential. The charging roller 11 is configured in a roller shape as a whole. The charging roller 11 is pressed against the surface of the photosensitive drum 1 with predetermined pressing force, and the charging roller 11 is driven to turn according to the rotation of the photosensitive drum 1 in the direction of arrow R1.

Bias voltage is applied to a metal core of the charging roller 11 by a charging bias power supply (not illustrated), thereby implementing the uniform contact charging of surface of the photosensitive drum 1.

In this embodiment, bias voltage obtained by superimposing 1.5 kVpp with DC voltage and AC voltage was applied to the metal core of the charging roller 11. By applying the AC voltage, it is possible to cause the potential on the photosensitive drum 1 to be converged to the same value as the voltage of the DC voltage. For example, the potential of the surface of the photosensitive drum 1 after charging at the time of the DC voltage=−600 V is −600 V.

A scanner 12 (exposure portion) is disposed on a downstream side of the charging roller 11. The photosensitive drum 1 is irradiated with laser beam depending on an image signal from the scanner 12. As a result, an electrostatic image is formed on the photosensitive drum 1.

Intensity of the laser beam of the scanner 12 can vary within a range of 0 to 255. By varying the intensity of laser beam, the latent image potential is changed. In this embodiment, the potential on the photosensitive drum 1 when the intensity of laser beam: L is changed to 0 to 255 is set to V (L) (V (L=0) to V (L=255)).

On the downstream side of the scanner 12, the development device 2 is disposed. Two-component developer using non-magnetic toner and magnetic carrier is housed in the development device 2. In this embodiment, a two-component developing method using the two-component developer was used. Furthermore, in this embodiment, a negatively charged toner was used.

The interior of the development device 2 is partitioned into a developing chamber 212 and a stirring chamber 211 by a partition wall 213 extending in a vertical direction.

A non-magnetic development sleeve 232 (a developer bearing member) is disposed on the developing chamber 212. A magnet 231 (magnetic field generating unit) is fixedly disposed in the development sleeve 232. The magnet 231 includes approximately three or more poles. In this embodiment, a 5-pole magnet was used. Thus, at least, as a development portion for developing an electrostatic latent image, the development device 2 and the development sleeve 232 are included.

A first conveying screw 222 and a second conveying screw 221 are disposed in the developing chamber 212 and the stirring chamber 211, respectively, as a developer stirring conveying unit.

The development sleeve 232, the first conveying screw 222, and the second conveying screw 221 are driven by a development drive motor 27.

The first conveying screw 222 stirs and conveys the developer of the developing chamber 212. Furthermore, the second conveying screw 221 stirs and conveys the toner supplied by the toner bottle 7, and the developer that is present in the development device 2 in advance. The uniform toner density of the developer in the development device 2 is obtained by the stirring conveyance.

An inductance sensor 26 (a density detector) is provided in the stirring chamber 211. The inductance sensor 26 detects the toner density (a ratio of toner and carrier: TD ratio) in the development device.

A disposition position of the inductance sensor 26 is disposed at a position where the toner supplied by the second conveying screw 221 from the toner bottle 7 and the developer already present in the development device 2 can be stirred and conveyed, and the developer, after making the toner density of the developer uniform, can be detected. In this way, it is possible to accurately detect the toner density of the developer by the inductance sensor 26.

In the partition wall 213 between the stirring chamber 211 and the developing chamber 212, in the drawings, a developer passage is formed through which the developing chamber 212 and the stirring chamber 211 communicate with each other at the end of the front side and the back side. For this reason, the developer conveyed by the conveying force of the first conveying screw 222 and the second conveying screw 221 circulates between the developing chamber 212 and the stirring chamber 211 through the developer passage.

Specifically, after the toner is consumed by the development and the toner density of the developer is lowered, the developer of the developing chamber 212 moves to the stirring chamber 211 from one developer passage. Since the toner is supplied to the stirring chamber 211 from the toner bottle 7, the toner density of the developer is recovered in the stirring chamber 211. Moreover, the developer after the recovery of the toner density moves to the developing chamber 212 from the other developer passage.

The two-component developer stirred by the first conveying screw 222 in the development device 2 is conveyed by the rotation of the development sleeve 232, while being constrained by the magnetic force of a conveying magnetic pole for pumping (pumping pole) N3 of the magnet 231. Furthermore, the developer is fully restrained by a conveying magnetic pole (cut pole) S2 having a flux density more than a certain level and is conveyed while forming a magnetic brush on the development sleeve 232.

Next, since the magnetic brush is ear-cut by the regulating blade 25, a thickness of a developer layer of the magnetic brush formed on the magnet 231 is adjusted to a proper length of the magnetic brush. Thereafter, along with the rotation of the conveying magnetic pole N1 and the development sleeve 232, the developer is conveyed to a development region facing the photosensitive drum 1. Here, the developer magnetic brush stands by the development pole S1 in the development region.

Moreover, by the development bias applied to the development sleeve 232, only the toner of the developer is transferred with respect to the electrostatic image on the photosensitive drum 1. Thus, the toner image corresponding to the electrostatic image is formed on the surface of the photosensitive drum 1.

A predetermined development bias is applied to the development sleeve 232 from a development bias power supply as a development bias output unit (not illustrated). In this embodiment, in the development sleeve 232, the development bias voltage obtained by superimposing the DC voltage (Dev DC=−500 V) and the AC voltage (Dev AC=1.3 KVpp) from a development bias power supply was used.

Figure 3:
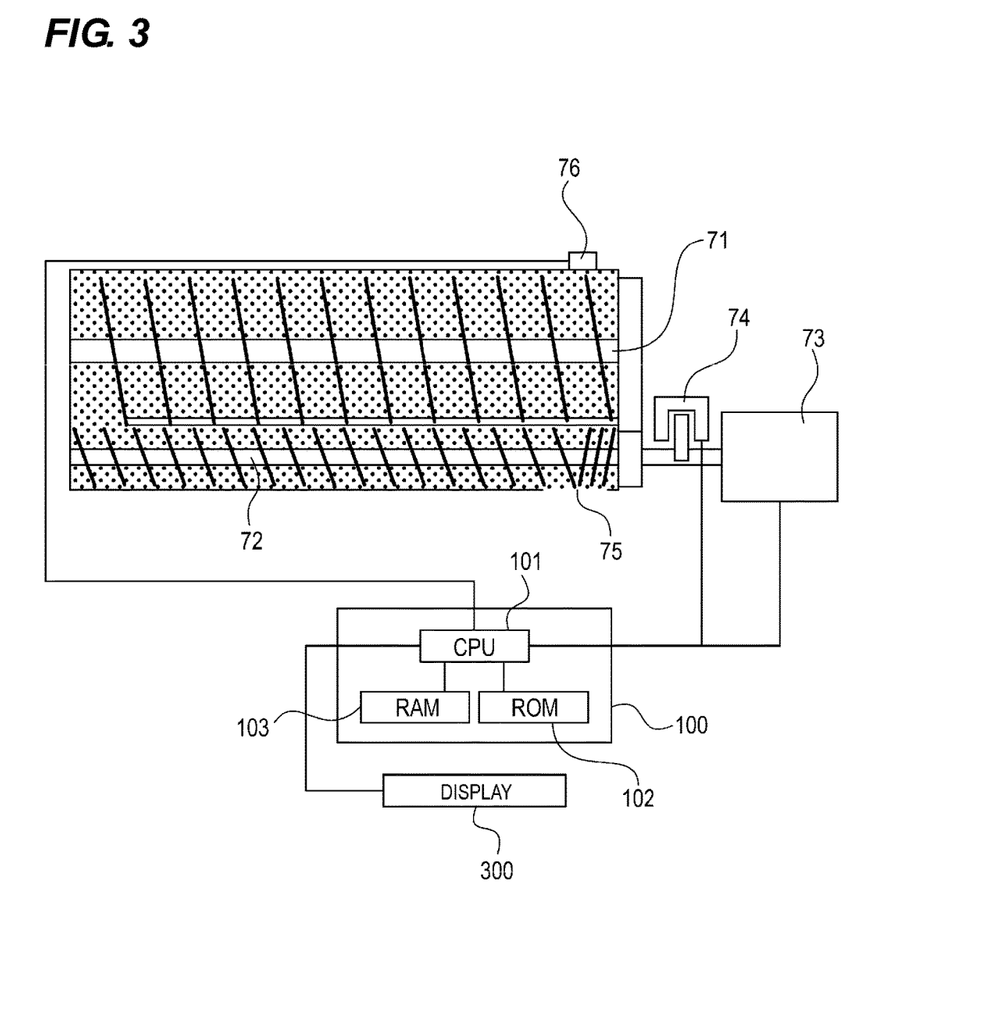
FIG. 3 is an explanatory view illustrating a configuration of the toner bottle.

The toner bottle 7 is attached to the development device 2 of the present embodiment. FIG. 3 is an explanatory diagram illustrating the configuration of the toner bottle.

As illustrated in FIG. 3, a supply motor 73 (a supply drive portion) is provided in the toner bottle 7 (supply device). A lower toner conveying screw 72 and an upper toner conveying screw 71 in the toner bottle 7 are rotated by the supply motor 73.

Moreover, when the supply motor 73 is driven, the lower toner conveying screw 72 rotates. The toner in the toner bottle 7 conveyed by the rotation of the lower toner conveying screw 72 is supplied to the development device 2 from a supply port 75 formed at the bottom of the toner bottle 7. By driving of the supply motor 73, the upper toner conveying screw 71 also rotates at the same time as the lower toner conveying screw 72 rotates, to convey the toner at the top of the toner bottle 7.

The control of each part of the apparatus, such as rotation control of the supply motor 73, and calculation of the remaining supply amount, is performed by the CPU 101 of the controller 100. It is possible to execute a toner checking mode (remaining amount determination mode) that interrupts the image forming operation and performs the toner supply to the development device 2 from the toner bottle 7, under the control of the controller 100, based on the detection result of the inductance sensor 26.

Furthermore, the rotation detection of the supply motor 73 is implemented by the rotation detection sensor 74. The rotation detection sensor 74 is able to perform the detection as a unit of one rotation of the screw. The CPU 101 performs the control so as to rotationally drive the supply motor 73 by the predetermined rotation. The control results of the controller 100 are displayed as needed through a display device 300 such as a display.

A toner bottle absence and presence sensor 76 is disposed at the top of the toner bottle 7. The toner bottle absence and presence sensor 76 determines the presence or absence of the toner bottle 7.

As illustrated in FIG. 2, in the rotational direction of the surface of the photosensitive drum 1, a primary transfer roller 14 is disposed on the downstream side of the development device 2. Both ends of the primary transfer roller 14 are urged against the photosensitive drum 1 by a pressing member such as a spring (not illustrated).

On the downstream side of the rotational direction of the photosensitive drum 1 from the position of the primary transfer roller 14, a cleaning device 15 is disposed. A cleaning blade of the cleaning device 15 removes the toner remaining on the photosensitive drum 1.

An image density sensor 31 configured to detect the density of the toner image formed on the intermediate transfer belt 81 is installed on the intermediate transfer belt 81.

When the transfer material P taken out of the sheet cassette 60 is conveyed to the conveying roller 41, the leading end of the transfer material P is stopped once by the conveying roller 41. Moreover, the transfer material P is fed from the conveying roller 41 according to the timing such that the toner image formed on the intermediate transfer belt 81 can be transferred to a predetermined position of the recording material.

Next, in the transfer material P, in a region in which the secondary transfer inner roller 39 and a secondary transfer outer roller 40 abut against each other, the above-described four color toner images are transferred onto the transfer material P, by the secondary transfer bias applied to the secondary transfer outer roller 40.

A cleaning device 50 is disposed on the downstream of the secondary transfer inner roller 39 in the conveying direction of the intermediate transfer belt 81. The cleaning blade of the cleaning device 50 removes the toner remaining on the intermediate transfer belt 81.

The transfer material P separated from the intermediate transfer belt 81 is conveyed to a fixing device 90. The toner image transferred onto the transfer material P is heated and pressurized by the fixing device 90. Thus, the toner image is melt and mixed to the transfer material P and is fixed onto the transfer material P. In the image information of the transfer material P that is output, the image density is calculated by a video counter 91 (an image density calculation portion), and the data is transmitted to the controller as a video count value.

Thereafter, the transfer material P is discharged to the outside of the image forming apparatus. In this embodiment, the image forming apparatus is able to discharge an image of A4 size at a maximum rate of 25 sheets per minute.

(Toner Supply Control)

The details of the toner supply control according to this embodiment will be described.

By developing the electrostatic image and consuming the toner, the toner density of the developer in the development device 2 drops.

For this reason, the toner supply control of supplying the toner to the development device 2 from the toner bottle 7 is implemented by the density control device. Thus, the toner density of the developer is controlled to be as constant as possible or the image density is controlled to be as constant as possible.

In this embodiment, the supply control is implemented based on two pieces of information. A supply amount at the time of the N-th image formation will be described below.

A video count value: $V_c$ is first calculated from the image information of the N-th output, and the calculated video count value is multiplied by a coefficient: $A(V_c)$ to calculate an amount of video count supply: $M(V_c)$.

Formula 1 is $M(V_c)=V_c \times A(V_c)$ (formula 1).

Here, when the image of the image ratio: 100% (entire solid black) is output, the video count value: $V_c$=1023, and the video count value: $V_c$ varies depending on the image ratio.

Second, the amount of inductor supply: M (Indc) is calculated by formula 2 to be described below, by multiplying a difference value between a TD ratio: TD (Indc) calculated from the N−1-th sheet detection result of the inductance sensor 26 and a target TD ratio: TD (target) by a coefficient: A (Indc).

Formula 2 is $M(Indc)=(TD(\text{target})-TD(Indc))\times A$ (Indc)           (formula 2).

Here, coefficients: A ($V_c$) and A (Indc) are recorded in the ROM 102 in advance.

The target TD ratio: TD (target), that is, a toner density target value is recorded in the RAM 103, and it is possible to change the setting value. In regard to a method of changing the target TD ratio: TD (target), in this embodiment, an image pattern (patch image Q) for detecting the image density is imaged for reference, and the image density is detected by the image density sensor 31 and is changed by the result thereof.

Figure 5:
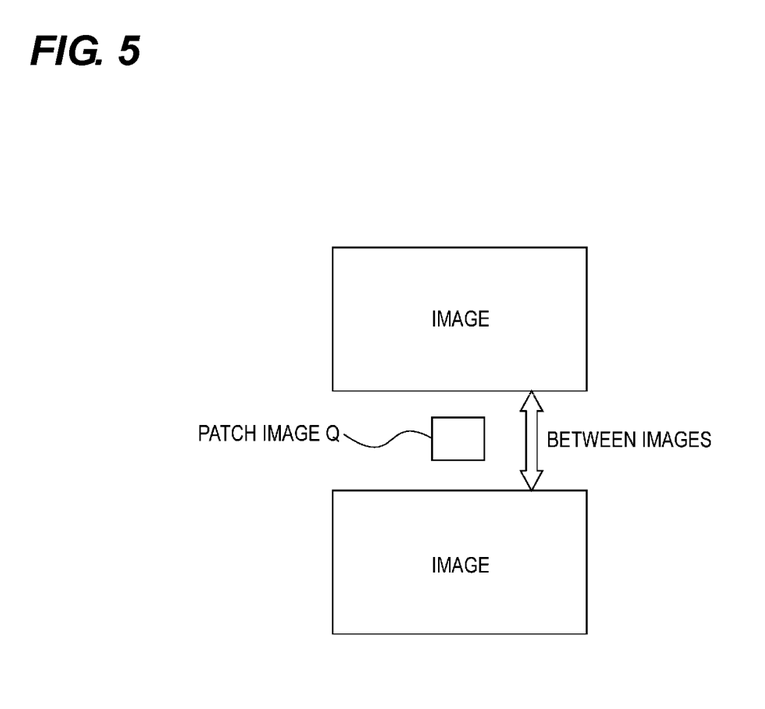
FIG. 5 is a diagram illustrating a formation timing of a patch image.

FIG. 5 is a diagram illustrating the formation timing of the patch image. As illustrated in FIG. 5, the patch image Q is imaged between the images of predetermined interval, and the image density thereof is detected by the image density sensor 31. The patch image Q is always performed under the same latent image conditions, and if the state of the developer is the same, the toner density of the developed toner image is the same.

Based on the detected value of the density of the patch image Q in the initial developer, the density is obtained from a difference ΔD between the reference value and the measurement result. For example, at the density: D (initial)=400 of the patch image Q in the initial developer, the density of the patch image Q measured when the image forming apparatus outputs the X-th sheet increases, and in the case of the density: D (X)=500, ΔD is obtained by formula 3 below.

Formula 3 is $\Delta D(X)=D(X)-D(\text{initial})=100$     (formula 3).

Here, a relation between ΔD (X) and a change width of the target TD ratio: TD (target): ΔTD (target) is recorded in the ROM 102 in advance. ΔTD (target) is calculated by the recorded data. Moreover, the target TD ratio: TD (target) is changed by adding and subtracting the calculated ΔTD (target).

The amount of toner supply: M is calculated by formula 4 below, by two values of the video count supply amount M ($V_c$).

Formula 4 is $M=M(V_c)+M(Indc)+M(\text{remain})$     (formula 4).

M (remain) is a remaining supply amount that remains without being able to implement the supply. The reason for occurrence of the remaining supply amount is to integrate the supply amount less than one rotation due to the fact that the supply is implemented as a unit of one rotation of the screw. The details thereof will be described below. Furthermore, when in the case of M<0, M equals to 0.

Next, the number of rotation: B of the supply motor 73 is calculated from the amount of toner supply: M. The toner conveying screw 72 rotates once to record the amount: T supplied to the development device in the ROM 102 in advance, and the number of rotation: B of the supply motor 73 is calculated from the calculated amount of toner supply M by formula 5 below.

Formula 5 is $B=M/T$     (formula 5).

After the decimal point of B is rounded down, only a positive number part is used. Since the amount of toner supply corresponding to after the decimal point of B is not supplied, the remaining amount of supply: M (remain) is calculated by formula 6 below.

Formula 6 is $M(\text{remain})=M-B\times T$     (formula 6).

From B calculated by formula 5, the supply motor 73 is driven in B rotations at the N-th sheet.

As described in item [problems to be resolved by the invention], in regard to the toner remaining amount checking sequence (toner checking mode), there is a problem in compatibility between the control time and the detection accuracy of "toner presence" and "toner absence". The contents of the problem will be specifically described below.

When the distribution of the TD ratio of the two-component developer in the development device is not constant, variations occur in the TD ratio detected by the toner density sensor. For this reason, there is a case where it is not possible to correctly determine whether the toner is supplied and the TD ratio increases.

Figure 4:
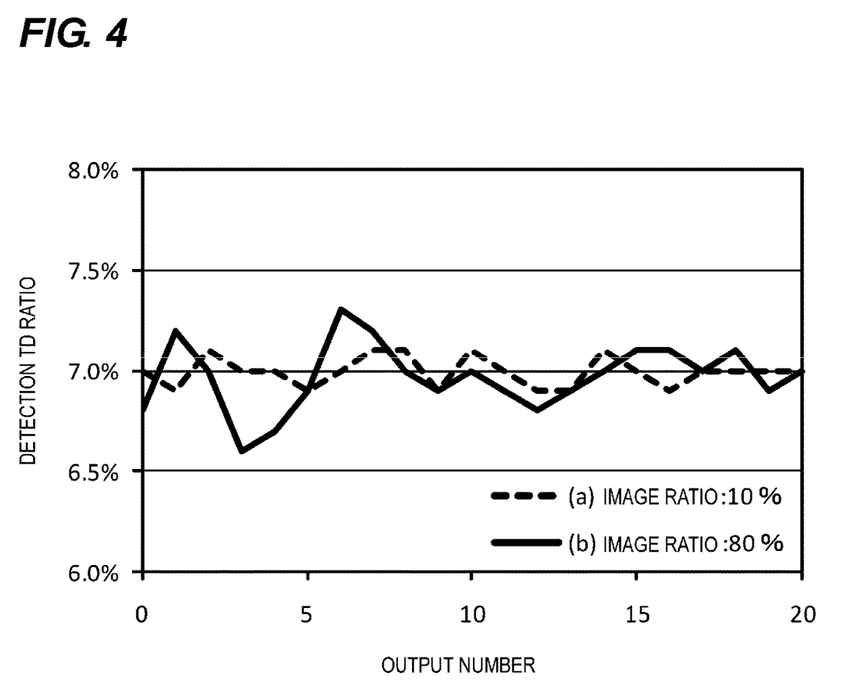
FIG. 4 is a diagram illustrating the TD ratio irregularity of the developer in the development device of a first embodiment.

Here, the TD ratio irregularity will be described. FIG. 4 is a diagram illustrating the TD ratio irregularity of the developer in the development device of the first embodiment.

The measurement of the TD ratio irregularity is performed in the following procedure. First, in a state in which there is no toner in the toner bottle 7, the image is continuously output under the condition of the image ratio: 10% (illustrated by a dotted line (a)) or under the condition of the image ratio: 80% (illustrated by a dashed line (b)). Next, after the detection TD ratio of the toner density sensor drops from 8% to 7%, the image is continuously output at the image ratio: 0% (solid white image). At that time, the transition of the TD ratio detected by the toner density sensor is illustrated in FIG. 4. In addition, when the image ratio: 100% is expressed, this case indicates that the black solid image is output to the entire surface.

From FIG. 4, it can be understood that there is an irregularity in the detection TD ratio when the image is output at the image ratio: 80%. When an image is formed on the photosensitive drum 1 by the development portion, there is a difference between a location where the toner consumes and a location where the toner is supplied. Then, under the condition of high image ratio, it takes time to obtain a uniform distribution of the TD ratio of the two-component developer in the development device 2. This is a factor in which variations occur in the distribution of the TD ratio of the two-component developer in the development device 2.

As illustrated in (b) of FIG. 4, even if the image ratio is high, the TD ratio distribution becomes uniform over time. However, as compared to the case where the image ratio is low, since it takes a long time until the uniform distribution, the toner remaining amount checking sequence takes time.

Furthermore, in a case where there is irregularity in the detection TD ratio, if a large amount of toner is supplied, it is possible to determine that there is toner. However, since it is not known how much the amount of toner supply is, there is a possibility of the oversupply. Therefore, there is a problem of compatibility between the control time of the toner remaining amount checking sequence and the toner absence checking accuracy.

(Detailed Description of Toner Remaining Amount Checking Sequence)

Figure 6:
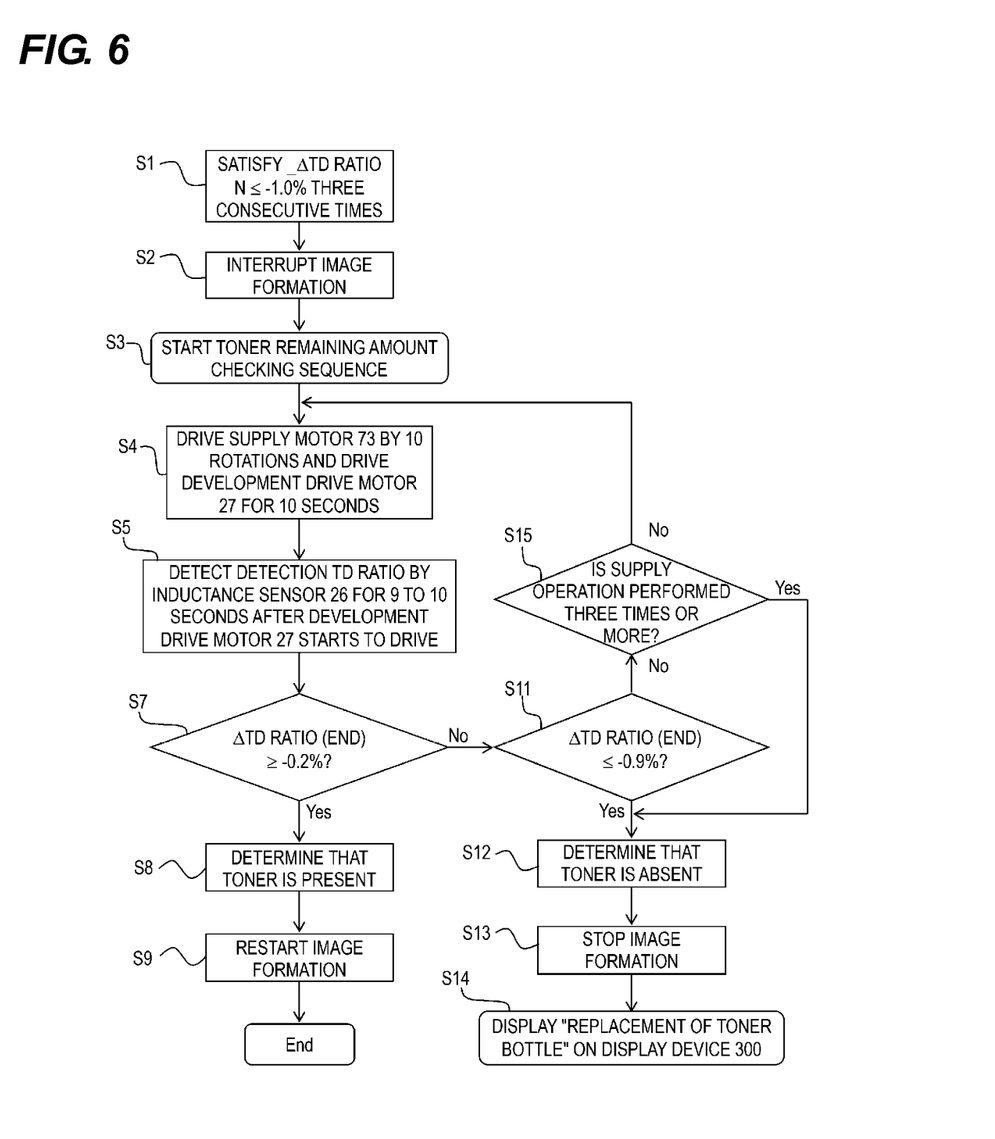
FIG. 6 is a diagram illustrating a flow chart of the first embodiment.

The checking control of toner absence in the toner bottle: the toner remaining amount checking sequence as characteristics of the present embodiment will be described below. The toner remaining amount checking sequence can be executed by the controller 100. FIG. 6 is a view illustrating a flow chart of the first embodiment. The description will be provided below with reference to the flow chart.

First, the conditions that enter the toner remaining amount checking sequence will be described. In the present embodiment, when the TD (Indc) N detected at the N-th sheet and the target TD ratio: TD (target) consecutively satisfy formula 7 below three times (S1), the image formation is interrupted (S2), and the toner remaining amount checking sequence is executed (S3).

Formula 7 is $\Delta TD$ ratio $N=TD(Indc)N-TD(\text{target})\leq-1.0\%$ \hfill (formula 7).

The value of −1.0% of (formula 7) and the conditions of the case where formula 7 is consecutively satisfied three times can also be other numbers. In this embodiment, the above-described conditions are set as conditions that do not carelessly enter the toner remaining amount checking sequence at the time of output of the entire solid image of the image ratio: 100%.

Figure 7:
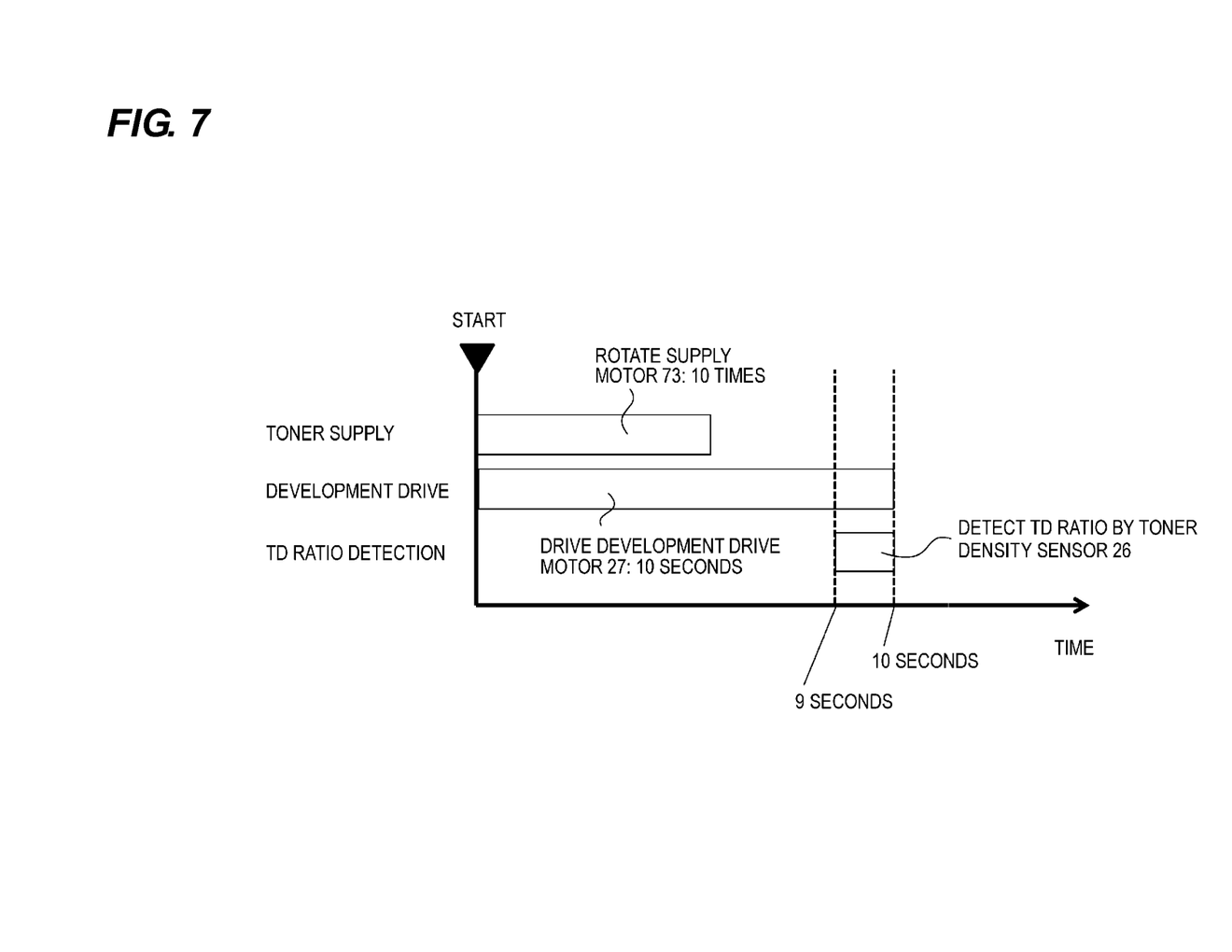
FIG. 7 is an explanatory view from the toner supply to the TD ratio detection of the first embodiment.

FIG. 7 is an explanatory view from the toner supply to the TD ratio detection of the first embodiment. As illustrated in FIG. 7, when implementing the toner remaining amount checking sequence (S4), the supply motor 73 rotates ten times, and the development drive motor 27 is driven for 10 seconds (S4). The number of rotations and time are defined by the amount of toner supply, or the time when the toner is supplied to and reaches the inductance sensor 26 after implementing the toner supply.

After that, the detection TD ratio between 9 and 10 seconds from the start of rotation of the development drive motor 27 is detected by the inductance sensor 26 (S5).

The number of supply times of the supply motor 73, the drive time of the development drive motor 27, and the timing of detecting the TD ratio by the inductance sensor 26 are set by the supply amount of the toner bottle 7, and the conveying time of the developer from the supply port 75 to the inductance sensor 26. It is important that these values be optimized according to the configuration of the image forming apparatus.

The TD ratio detected by the inductance sensor 26 between 9 and 10 seconds from the start of rotation of the development drive motor 27 is assumed to be a detection TD ratio: TD (Indc) R. Moreover, it is determined whether a difference value: ΔTD ratio (END) between the detection TD ratio: TD (Indc) R and the target TD ratio: TD (target) satisfies the relation of formula 8.

Formula 8 is $\Delta TD$ ratio$(END)=TD(Indc)R-TD(\text{target})\geq-0.2\%$ \hfill (formula 8).

In this embodiment, −0.2% is referred to as "toner presence determination value".

When satisfying the formula 8 as a determination formula, "toner presence" is determined (S8). In this case, the toner remaining amount checking sequence is terminated and the image formation resumption is allowed (S9), and the toner supply is terminated (S10).

When not satisfying the formula 8 at (S7), the process proceeds to (S11). At (S11), it is determined whether the ΔTD ratio (END) satisfies the relation of formula 9 below.

Formula 9 is $\Delta TD$ ratio$(END)=TD(Indc)R-TD(\text{target})\leq-0.9\%$ \hfill (formula 9).

In this embodiment, −0.9% is referred to as "toner absence determination value".

When satisfying the formula 9 as a determination formula at (S11), "toner absence" is determined (S12). Moreover, the toner remaining amount checking sequence is terminated to stop the image formation resumption (S13). In this case, "please replace the toner bottle" is displayed on the display device 300 (S14).

When the detection TD ratio: TD (Indc) R detected at (S7) and (S11) satisfies none of the formula 8 and the formula 9 (is greater than −0.9% and smaller than −0.2% as a numerical value), the process proceeds to (S15).

Figure 8:
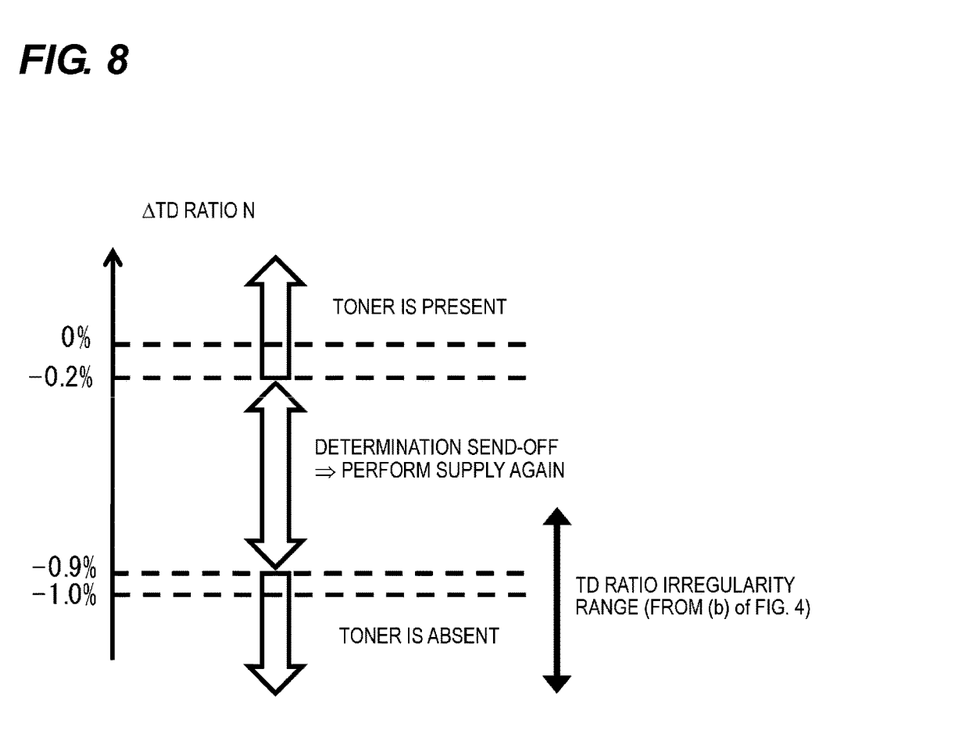
FIG. 8 is a diagram illustrating the determination after the detection of a ΔTD ratio (END) of the first embodiment.

FIG. 8 is a diagram illustrating the determination after detection of the ΔTD ratio (END) of the first embodiment.

As illustrated in FIG. 8, in this embodiment, "toner presence" is assumed from the ΔTD ratio (END)≥−0.2%. Furthermore, "toner absence" is assumed from the ΔTD ratio (END)≤−0.9%. Moreover, "determination send-off" is assumed from −0.2%>ΔTD ratio (END)>−0.9%, and the supply operation of repeat of (S5) is implemented until three times (a predetermined number of times) of the cumulative number of supply times of the supply operation of (S5).

As described above, in this embodiment, the supply operation is executed again from the range of −0.2%>ΔTD ratio (END)>−0.9%. The reason for executing the supply operation again is that when irregularity occurs in the TD ratio of the developer in the development device 2 (see (b) of FIG. 4), it is not possible to determine whether the toner is reliably supplied (toner presence) or the toner is not supplied (toner absence).

In this embodiment, by the range of irregularity of the TD ratio of the results of (b) of FIG. 4, the supply operation is implemented and set again from the range of −0.2%>ΔTD ratio (END)>−0.9%, but it may be within other ranges.

Under the conditions that the cumulative number of supply times at (S15) is less than three times, the supply operation of (S5) is implemented again. In this case, the ΔTD ratio (END) is detected again, and the determination whether the ratio corresponds to formula 8 or formula 9 at the values is repeated.

Even if the cumulative number of supply times of the supply operation of (S5) is three times, when the ΔTD ratio (END) does not become −0.2% or more, even in consideration of the irregularity of the TD ratio of the developer in the development device 2, there is a state in which there is reliably no toner.

In this case, it is determined that "toner absence" without returning to (S5) again (S12), and the toner remaining amount checking sequence is terminated to stop the image formation resumption (S13). Moreover, "please replace the toner bottle" is displayed on the display device 300 (S14).

In addition, in this embodiment, even if the supply operation at (S5) is implemented three times, under the conditions that the ΔTD ratio (END) is not −0.2% or more, it is determined that there is no toner in the toner bottle 7, but the number of times may increase.

As described above, the controller 100 of the present embodiment selectively performs at least three states after executing the start of the toner remaining amount checking sequence, based on the detection result obtained by the inductance sensor 26. Specifically, the states include a first state of immediately inhibiting the image formation, a second state of allowing the image forming operation, and a third state of executing the toner remaining amount checking sequence again.

The respective states described above are divided into a case where the toner remaining amount checking sequence starts and it is possible to determine "toner presence" or "toner absence" by one supply operation, and a case where it is possible to determine "toner presence" or "toner absence" by two or three supply operations.

When it is not possible to perform the determination in the one supply operation (first state and second state), it is possible to terminate the toner remaining amount checking sequence in a short time, thereby reducing the downtime.

Meanwhile, when discriminating the two or three supply operations (third state), it is possible to increase accuracy of "toner absence" determination. In this case, by preventing the determination of "toner absence" in a state in which the toner is sufficiently present in the toner bottle, it is possible to reduce the stress with respect to the user in terms of the toner bottle life.

By performing the control as described above, it is possible to suppress a decrease in accuracy of the toner remaining amount determination, while shorting the downtime due to the toner remaining amount checking sequence as much as possible.

Second Embodiment

A configuration of the second embodiment will be described. The description for same configurations as those of the embodiment described above will not be provided.

In the first embodiment, "toner presence" was assumed from the $\Delta$TD ratio (END)$\geq$−0.2%. The value of −0.2% is referred to as "toner presence determination value". Here, when the "toner presence determination value" is lowered, for example, when the value is lowered from −0.2% to −1.0%, the frequency in which the toner remaining amount checking sequence starts and "toner presence" is obtained by one supply operation increases. However, in some cases, "toner presence" is determined by mistake depending on irregularity of the TD ratio of the developer in the development device 2.

As the problem in a case where "toner presence" is determined by mistake, there are the following problems. That is, until implementing the toner remaining amount checking sequence again, when the TD ratio decreases, the carrier may adhere to the photosensitive drum. For this reason, there is a problem in that the image of the portion of the adhered carrier comes out. Since this problem is hard to occur in a case where the TD ratio is high, the target TD ratio: TD (target) may be set to a high level.

In this embodiment, the controller changes the target TD ratio: TD (target) depending on the density of the patch image Q. In particular, the target TD ratio changes depending on the degree of durability of the developer in the development device 2. Moreover, by changing the TD ratio of the developer so as to maintain a constant density of the patch image Q, a change in the toner charging amount of the developer is suppressed to stabilize the image density. In addition, an upper limit value is set in the target TD ratio: TD (target). Furthermore, in the target TD ratio: TD (target), a lower limit value is set so that carrier adherence does not occur.

Thus, in the second embodiment, a threshold value as a "toner presence determination value" is changed depending on the value of the target TD ratio: TD (target) determined according to the density of the patch image Q.

Figure 9:
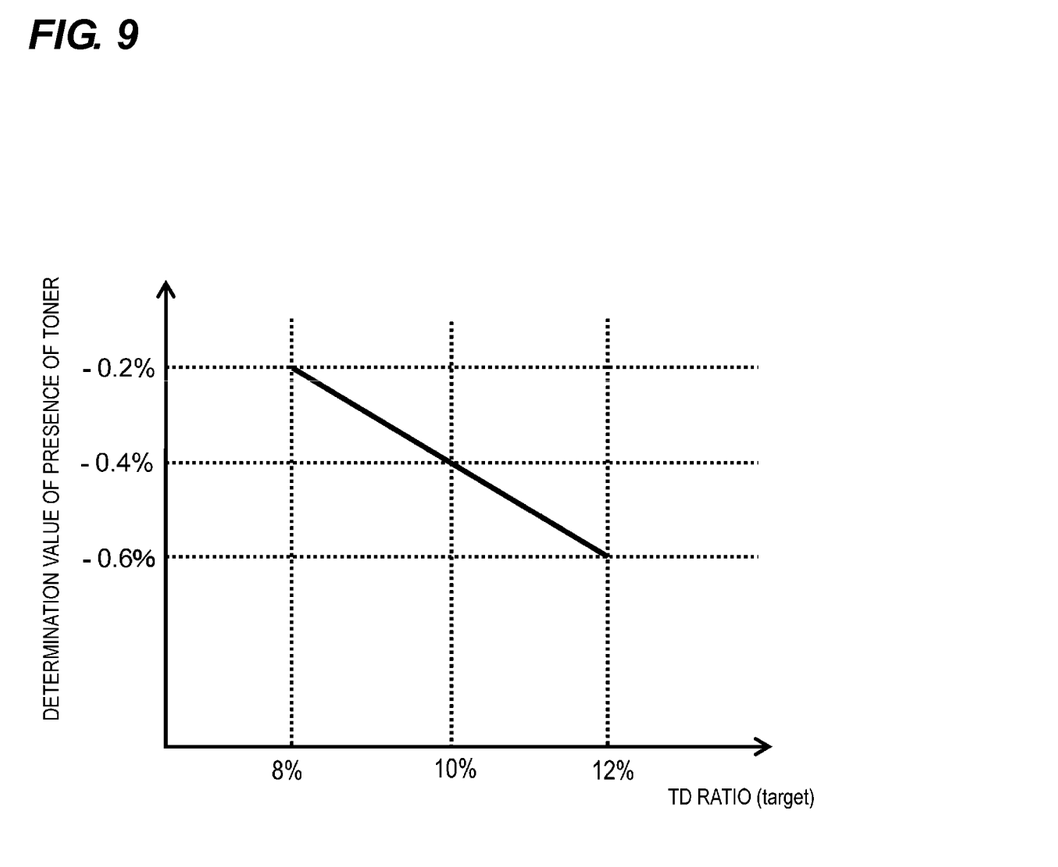
FIG. 9 is a diagram illustrating a relation between a target TD ratio and a toner presence determination value of a second embodiment.

FIG. 9 is a diagram illustrating a relation between the target TD ratio of the second embodiment and the toner presence determination value. Specifically, FIG. 9 illustrates the relation between the target TD ratio: TD (target) and "toner presence determination value". The relation of FIG. 9 is recorded in the ROM 102 in advance. The "toner presence determination value" may be set to other values as long as the numerical values are greater than −0.9% illustrated in the first embodiment.

Third Embodiment

A configuration of the third embodiment will be described. The description for same configurations as those of the embodiment described above will not be provided.

In the first embodiment, "toner absence" was assumed from $\Delta$TD ratio (END)$\leq$−0.9%. The value of −0.9% is referred to as a "toner absence determination value". In the determination of the flow chart (S15) of FIG. 6 in the first embodiment, a case of executing the supply operation of repetition (S5) is the same.

After outputting the image having the high image ratio, even when irregularity occurs in the TD ratio of the developer in the development device 2, as illustrated in FIG. 4, the irregularity decreases over time. Therefore, when implementing the supply operation of repetition (S5), even if the threshold as "toner absence determination value" increases, for example, even if the value increases from −0.9% to −0.2% side, the possibility of wrong determination of "toner absence" decreases.

For this reason, in the third embodiment, when executing the supply operation of repetition (S5), the controller raises "toner absence determination value". Thus, there is a high possibility that it is possible to determine as "toner absence" in the second supply operation. Then, it is possible to shorten the time of the toner remaining amount checking sequence.

In addition, in the third embodiment, in the determination of the flow chart (S15) of FIG. 6, when implementing the supply operation of repetition (S5), "toner absence determination value" was changed from −0.9% to −0.7%, but other numerical values may be used. However, it is necessary to protect the relation of "toner presence determination value">"toner absence determination value".

Fourth Embodiment

The configuration of the fourth embodiment will be described. The description for same configurations as those of the above-described embodiments will not be provided.

In the first embodiment, in determination of the flow chart (S15) in FIG. 6, the supply conditions in the case of performing the supply operation of repetition (S5) were the same as the first supply conditions (the supply motor 73 is rotationally driven ten times).

However, in the case where the $\Delta$TD ratio (END) is close to −0.2% (for example, −0.3%), when the supply motor 73 is rotationally driven ten times in the supply operation of repetition (S5), there is a risk of an increase in amount of toner supply. In this case, the ratio may greatly exceed the target TD ratio: TD (target). Moreover, when the ratio greatly exceeds the target TD ratio: TD (target), there is a risk such as toner scattering or fog image of white background.

Therefore, in the fourth embodiment, the controller changes the supply number of rotation: M of the supply motor 73 depending on the value of the preceding $\Delta$TD ratio (END).

Figure 10:
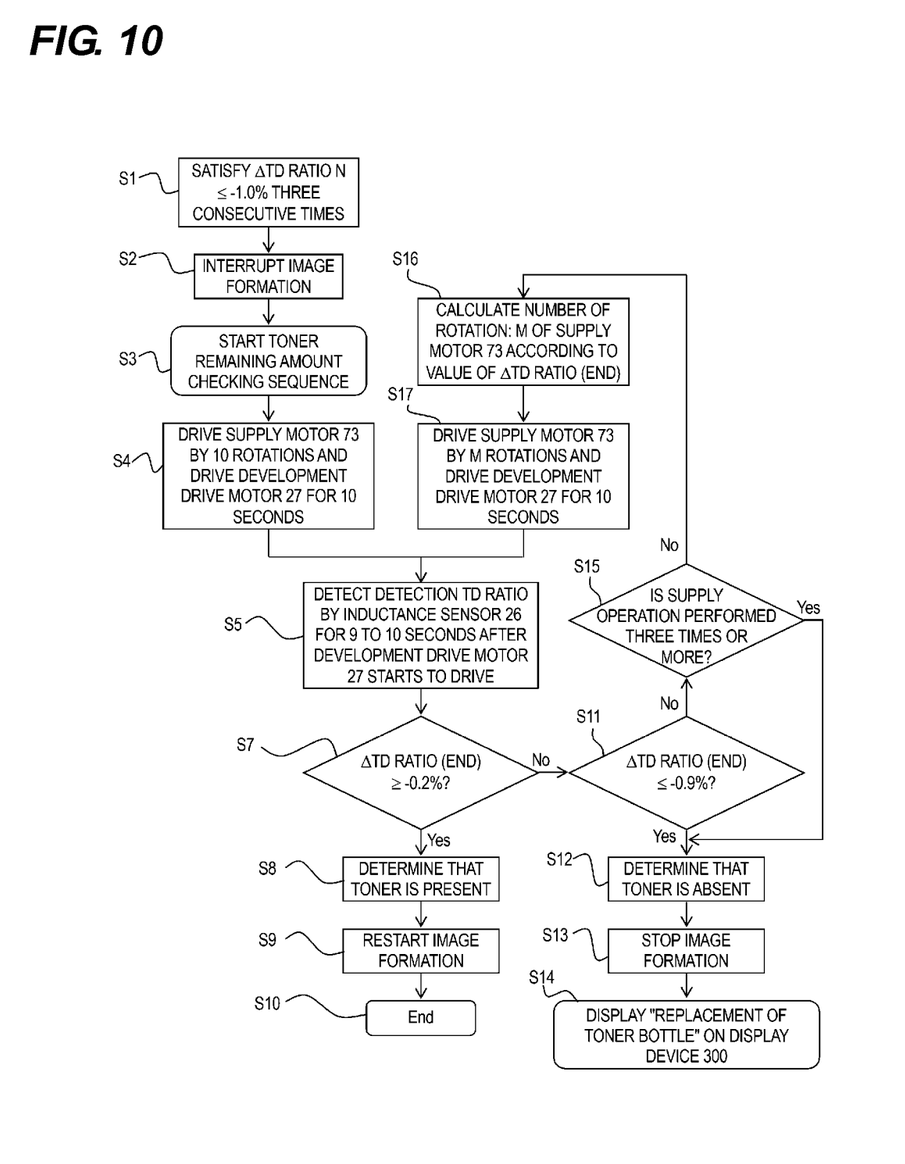
FIG. 10 is a diagram illustrating a flow chart of a fourth embodiment.

FIG. 10 is a view illustrating a flow chart of the fourth embodiment. The basic flow is the same as that of FIG. 6 of the flow chart of the first embodiment, but in the fourth embodiment, the flows of (S16) and (S17) are added.

Figure 11:
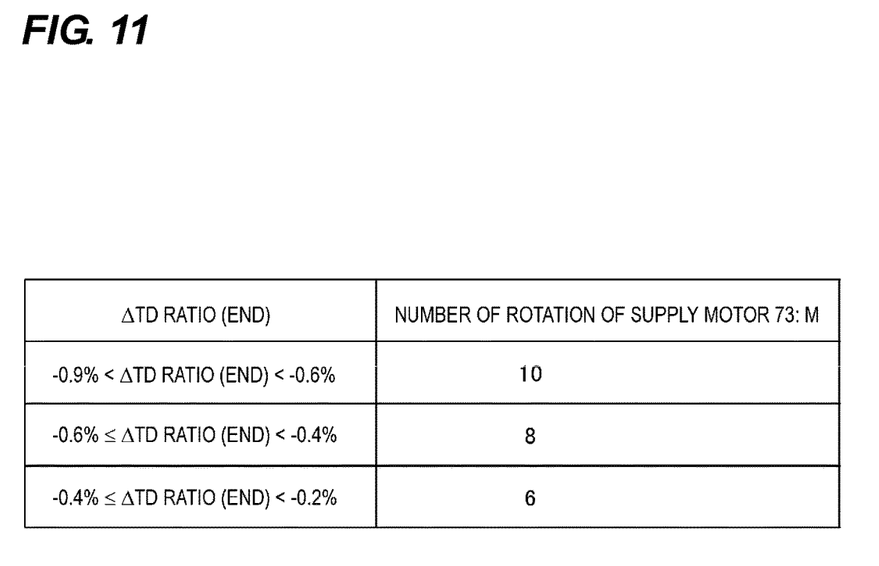
FIG. 11 is a table of a relation between the ΔTD ratio (END) and the drive number of times of the supply motor of the fourth embodiment.

When it is determined to implement the repeated supply operation at (S15), the supply number of rotation: M of the supply motor 73 is determined by the value of the $\Delta$TD ratio (END) (S16). The relation between the ΔTD ratio (END) and the supply number of rotation: M of the supply motor 73 as used at (S16) is stored in the ROM 102 in advance. FIG. 11 is a table of the relation between the ΔTD ratio (END) and the drive number of times of the supply motor of the fourth embodiment.

From the relation illustrated in FIG. 11, the supply number of rotation: M of the supply motor 73 is determined, the process proceeds to the flow of (S17), and the supply operation is implemented. In FIG. 11, when the ΔTD ratio (END) is more than −0.9% and less than −0.6%, M=10, when the ratio is −0.6% or more and less than −0.4%, M=8, and when the ratio is −0.4% or more and less than −0.2%, M=6, but the embodiment is not limited thereto.

With the above-described configuration, it is possible to suppress a decrease in accuracy of the toner remaining amount determination, while shortening the downtime due to the toner remaining amount checking sequence as much as possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-169603, filed Aug. 19, 2013, which is hereby incorporated by reference herein in its entirety.

What is claimed is:

1. An image forming apparatus capable of performing an image forming operation in which an image is formed on a recording material using toner, comprising:
    an image bearing member;
    a developing device having a developer container configured to contain developer including the toner and magnetic carrier, a developer feeding portion configured to feed the developer contained in the developer container and a developer bearing member configured to bear the developer for developing an electrostatic image formed on the image bearing member with the developer;
    a toner container provided detachably mountable to a mount portion of the image forming apparatus and configured to supply toner to the developer container;
    a drive motor driven to rotate to supply the developer contained in the toner container to the developer container;
    a detection unit configured to detect toner density as a ratio of toner and magnetic carrier of the developer contained in the developer container; and
    a controller configured to interrupt the image forming operation and to perform a toner supply operation in which the drive motor is driven to rotate in a state in which the image forming operation is interrupted,
    wherein the controller performs the toner supply operation when a predetermined condition is met, the predetermined condition including a condition that a first detected toner density, which is the toner density detected by the detection unit while the image forming operation is being performed, is less than a predetermined value, and
    wherein each time the controller performs the toner supply operation once, the controller is configured to select and perform the following operations (i), (ii) and (iii) based on a second detected toner density which is the toner density detected by the detection unit accompanied by performing the toner supply operation once:
    (i) placing the image forming apparatus in a state in which an interrupted image forming operation can be resumed when the second detected toner density is greater than a first threshold value,
    (ii) repeatedly performing the toner supply operation once when the second detected toner density is less than the first threshold value and greater than a second threshold value which is less than the first threshold value, and
    (iii) notifying that the toner container mounted on the mount portion should be exchanged when the second detected toner density is less than the second threshold value.

2. The image forming apparatus of claim 1, wherein the controller is capable of changing a number of rotations of the drive motor according to the second detected toner density when the controller repeatedly performs the toner supply operation once.

3. The image forming apparatus of claim 1, wherein the controller is configured to place the image forming apparatus in a state in which resumption of the image forming operation is restricted when the controller performs the operation of notifying that the toner container mounted on the mount portion should be exchanged.

4. The image forming apparatus according to claim 1, wherein the controller repeatedly performs the toner supply operation once when the second detected toner density is less than the first threshold value and the second detected toner density is greater than the second threshold value and the toner supply operation is not performed a predetermined number of times, and
wherein the controller notifies that the toner container mounted on the mount portion should be exchanged when the second detected toner density is less than the first threshold value and the second detected toner density is greater than the second threshold value and the toner supply operation is performed a predetermined number of times.

5. The image forming apparatus according to claim 1, wherein the controller is capable of changing the second threshold value according to a number of times the toner supply operation is repeatedly performed.

6. The image forming apparatus according to claim 1, wherein the detection unit detects the toner density each time the image forming operation is performed for a sheet of recording material in the image forming operation for sheets of recording materials, and
wherein the controller performs the toner supply operation when the first detected toner density is less than the predetermined value for a predetermined number of consecutive sheets in the image forming operation for sheets of recording materials.

* * * * *